(No Model.)  3 Sheets—Sheet 1.
C. W. HALL.
CLOTHES PIN MACHINE.
No. 513,572. Patented Jan. 30, 1894.
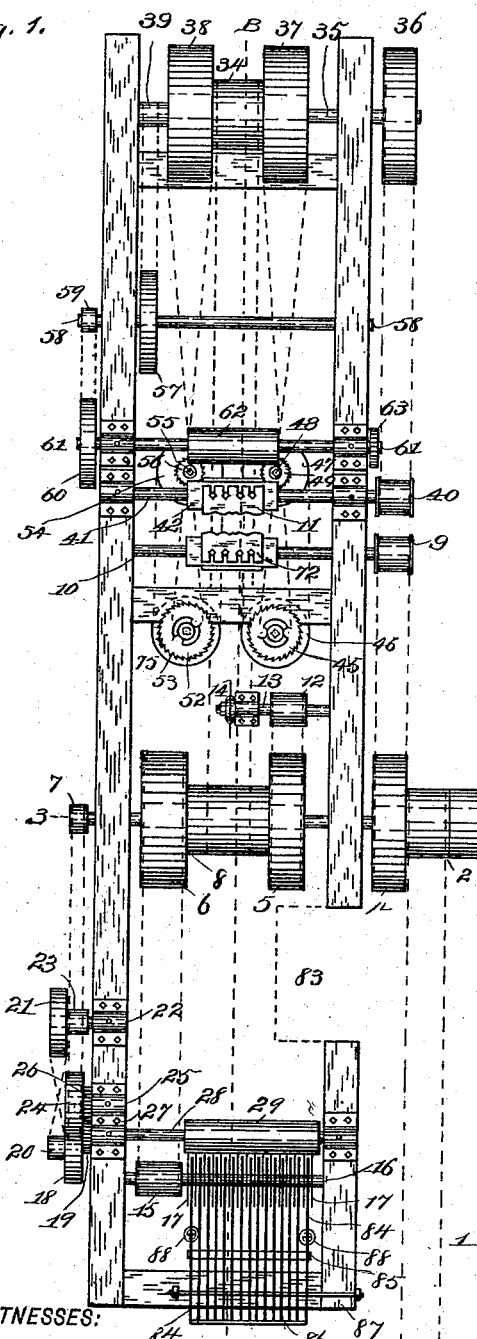
WITNESSES:
INVENTOR
Charles W. Hall,
BY
Knight Bros.
ATTORNEYS.
THE NATIONAL LITHOGRAPHING COMPANY,
WASHINGTON, D. C.

(No Model.) 3 Sheets—Sheet 2.
C. W. HALL.
CLOTHES PIN MACHINE.
No. 513,572. Patented Jan. 30, 1894.
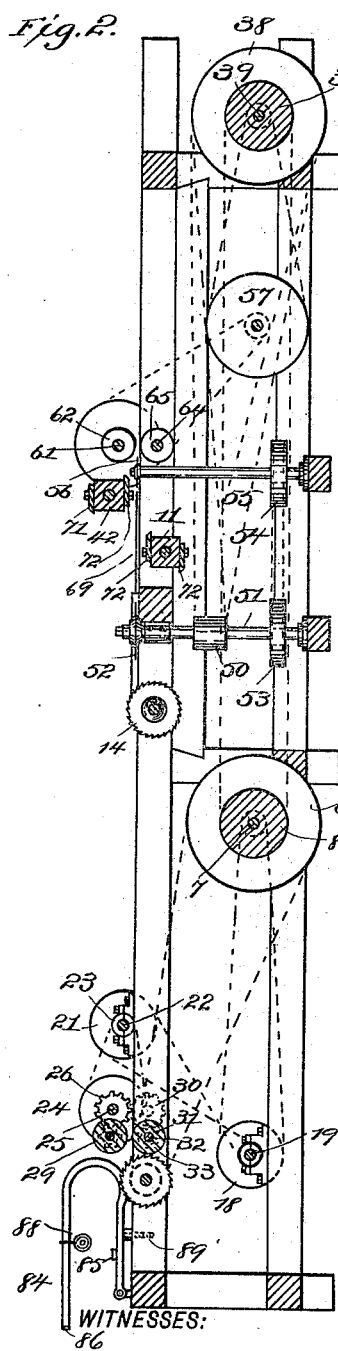
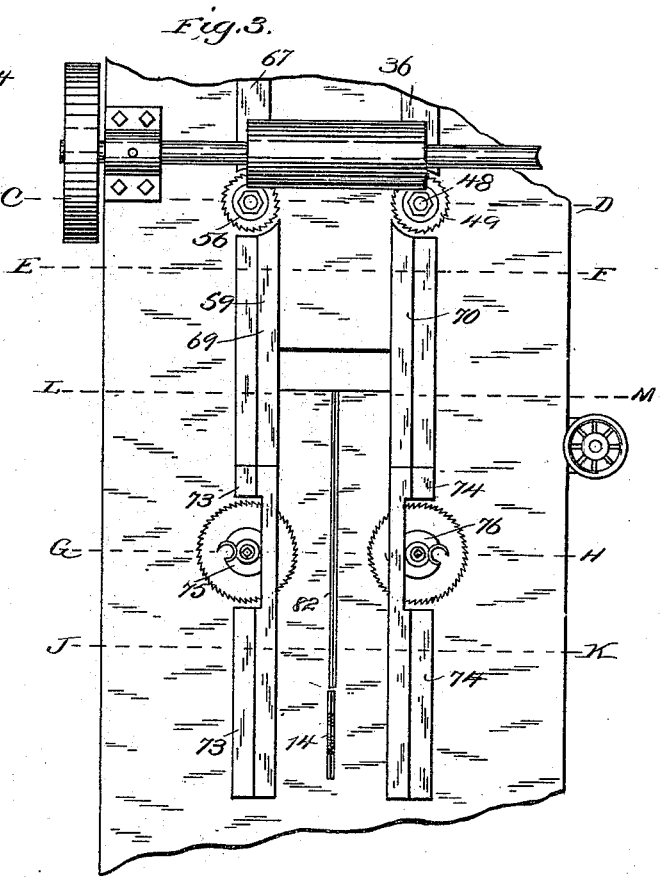
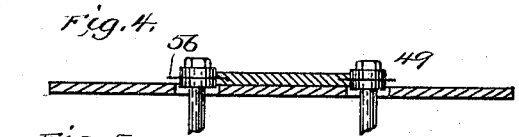
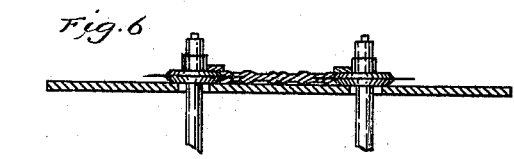
WITNESSES:
INVENTOR
Charles W. Hall
BY
Knight Bros.
ATTORNEYS.

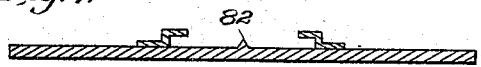
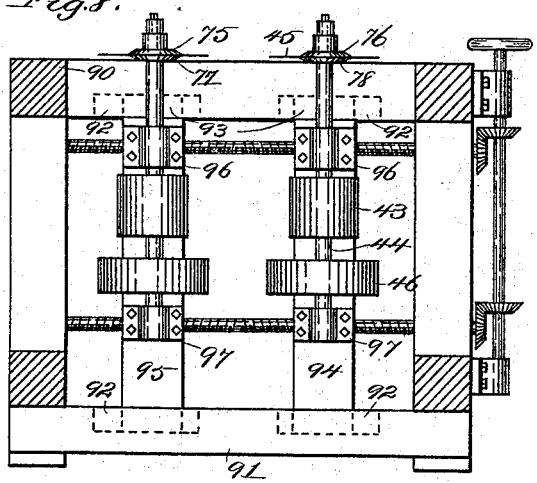
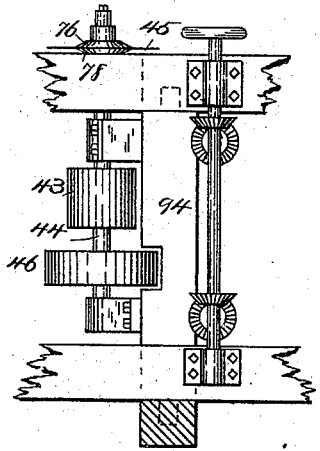
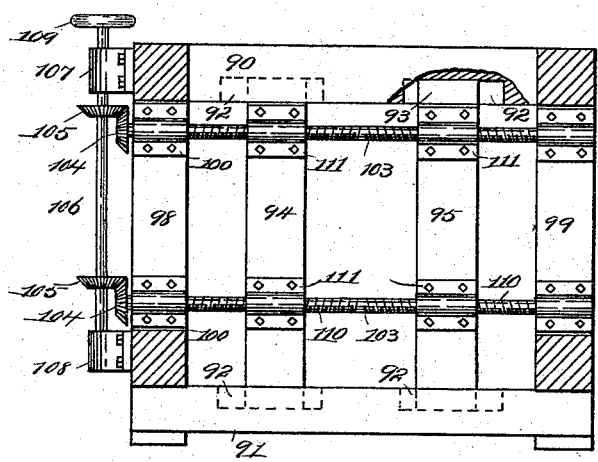
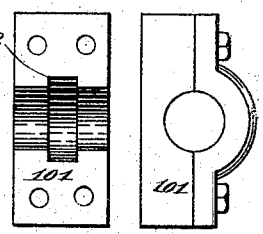
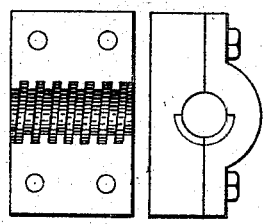

UNITED STATES PATENT OFFICE.

CHARLES W. HALL, OF BRADFORD, ASSIGNOR TO DAVID HOWELLS, MELVIN W. MOFFITT, JOSHUA DAVIS, AND GEORGE W. CAMPBELL, OF KANE, PENNSYLVANIA.

CLOTHES-PIN MACHINE.

SPECIFICATION forming part of Letters Patent No. 513,572, dated January 30, 1894.

Application filed February 16, 1893. Serial No. 462,557. (No model.)

*To all whom it may concern:*

Be it known that I, CHARLES W. HALL, a citizen of the United States, residing at Bradford, in the county of McKean and State of Pennsylvania, have invented certain new and useful Improvements in Machines for Making Clothes-Pins, of which the following, taken in connection with the accompanying drawings, is a specification.

My invention relates to machines for making clothes-pins in which the boards out of which the pins are to be made, are cut in blocks of sufficient length to make two blocks for the gang saws to cut up into clothes-pins, the original blocks being fed to the machine so that the molding-knives cut across the grain of the wood (called traversing) and then turning the molded blocks so that the gang saws cut with the grain. In the clothes-pin so constructed the head is at such a distance from the upper end of the slot as to form a handle for manipulating the pin, while the body portion where the slot is formed is made thin enough to cause the prongs to be flexible, while a portion of the body at the upper end of the slot is of sufficient thickness to withstand the spreading strain on the prongs which they are subjected to when the pin is in use, and my invention consists of certain features of novel construction as will be hereinafter fully described and pointed out in the claims.

I the drawings: Figure 1 is a top view of the machine with the table removed. Fig. 2 is a view in cross-section taken on the line A, B of Fig. 1. Fig. 3 is a top view of a portion of the table, showing the block guides, the upper feed roller, and saws. Fig. 4 is a cross-section of the table through the line C, D, of Fig. 3, showing a block which has passed the feed rollers and being between the first set of saws. Fig. 5 is a cross-section of the table taken on the line E, F, of Fig. 3, and shows the block (it having passed the first set of saws) with the guides in the slots formed by said saws. Fig. 6 is a cross-section of the table through the line G, H, of Fig. 3, showing the block it) having passed through the molding-knives) and being between the cope saws. Fig. 7 is a cross-section of the table through the line J, K, of Fig. 3, and shows the form of the guides at that point, also the rib guide for the groove which is made by the molding knives, in the center of the block. Fig. 8 is a cross-section view of the frame of the machine at the line J, K, of Fig. 3, looking toward the cope saws. Fig. 9 is a side elevation of Fig. 8. Fig. 10 is a view in cross-section of the frame of the machine at the line L, M, of Fig. 3, looking toward the cope saws and shows the method of adjusting the same. Fig. 11 is a side elevation of the end journal box of the screw-threaded shafts. Fig. 12 is a top view of the lower part of said journal box and shows an annular recess for the purpose of receiving a collar which is on the end of a screw-threaded shaft. Fig. 13 is a side elevation of the intermediate boxes of the screw-threaded shafts. Fig. 14 is a top view of the lower portion of said boxes and shows it provided with a screw-thread for the purpose of engaging with the threads of the screw-threaded shafts. Fig. 15 is a perspective view of the guide used after the first set of saws. Fig. 16 is a perspective view of the guide used after the block has passed the molding-knives. Fig. 17 is a perspective view of a portion of the two aforementioned guides showing their relative positions when joined together. Fig. 18 is a perspective view of the block prepared for the machine. Fig. 19 is a perspective view of the block after passing the saws, molding-knives and copes. Fig. 20 is a perspective view of a completed clothes-pin after it leaves the gang saws.

In the drawings: 1 represents the main driving-belt, which is connected to the pulley 2, which is mounted on the shaft 3. Mounted on the shaft 3, are also the pulleys 4, 5, 6 and 7, and the drum 8. The pulley 4, is belted to the pulley 9, and drives the shaft 10, on which is the lower cutter-head 11. The pulley 5, is belted to the pulley 12, and drives the horizontal saw-arbor 13, on which is the perpendicular dividing saw 14. The pulley 6, is belted to the pulley 15, and drives the shaft 16 on which are mounted the gang saws 17. The pulley 7, is belted to the pulley 18, which is on the short counter-shaft 19, and on said shaft the small pulley 20 is secured, which is belted to pulley 21, on the short counter-shaft 22. On the shaft 22, is also the small pulley 23, belted to the pulley 24, which is on shaft 25, On the shaft 25, is secured the spur-wheel 26, which meshes with the pinion 27, secured to the shaft 28, and drives said shaft. On the shaft 28 is mounted the upper feed roller 29, of the gang saws 17. The spur-wheel 26, also meshes into and drives the spur-wheel 30 (shown in dotted lines) and which meshes with the pinion 31, (also shown in dotted lines) on the shaft 32. On shaft 32, is also the lower feed roller 33, of the gang saws 17. The drum 8, is belted to the drum 34, which is on the counter-shaft 35, and transmits the power thereto, and on the shaft 35 are also the pulleys 36, 37, 38, and 39. Pulley 36 is belted to pulley 40, and drives shaft 41, on which the upper cutter-head 42, is mounted. Pulley 37, is belted to pulley 43, and drives the perpendicular saw-arbor 44, on which is mounted the horizontal saw 45. On the shaft of saw-arbor 44 is also the pulley 46, which is belted to the pulley 47 and which is on and drives the perpendicular saw-arbor 48, and on the perpendicular saw-arbor 48 is the horizontal saw 49. The pulley 38, is belted to and drives the pulley 50, which is on the perpendicular saw-arbor 51, and which carries the horizontal saw 52. On the saw-arbor 51, is also the pulley 53, which is belted to and drives the pulley 54, on the saw-arbor 55, and which carries the horizontal saw 56. The pulley 39, is belted to and drives the pulley 57, on the shaft 58. On the outer end of shaft 58, is secured the pulley 59, which is belted to and drives the pulley 60, secured on one end of the shaft 61. On said shaft is also the upper feed roller 62 of the cutter-heads 11, and 42, and on the other end is the spur-wheel 63, which meshes in a spur-wheel directly underneath it, (not shown) which is secured on and drives the shaft 64 to which the lower feed roller 65 is secured.

The process of manufacturing is as follows:—Prepared blocks similar to 66, (Fig. 18) are inserted between the two guide-plates 67 and 68, and are fed to the rollers 62, 64 longitudinally with regard to the grain of the wood, which carry them to the saws 49, 56. Said saws slot their ends so that they can pass on to and be movably held by the guides 69 and 70. (See Figs. 4 and 5.) They then pass along the guides 69 and 70, under the molding-knives 71, on the cutter-head 42, and over the molding-knives 72, of the cutter-head 11. This forms the molding on the top and bottom of the blocks which consists of the rounded head A, the contracted portion B, and the enlarged or bulged portion C, which forms a handle for the pin. The enlarged or bulged portion C, adds to the strength of the pin and prevents the same from splitting when the prongs are forced apart. The lower central groove 81 of the block passes on to the ribbed guide 82, (see Figs. 3 and 7) which prevents a lateral movement of the molded blocks. They then leave the guides 69 and 70, and pass under the guides 73 and 74, where they are carried to the saws 45 and 52, which form the spring prongs D, E. These saws are each provided with the top cope (head with cutter-knives) 75, and 76, and on the bottom cope 77 and 78 respectively, these copes are for the purpose of forming the bevels 79 and 80, on the ends of the prongs of the clothes-pins. (See Figs. 6, 19, and 20.) After passing the cope saws they are carried to the upright dividing-saw which cuts them in two, through the central groove 81, (Fig. 19.) They are then taken by the attendant who is stationed in the recess 83, and passed with the head first, between the rollers 29 and 33, which feed them to the gang-saws 17. The gang-saws 17, is a series of thin circular saws on the shaft 16, and are spaced the necessary distance apart to saw the blocks up to the proper width for clothes-pins. The rollers 29 and 33 are made of, or provided on their peripheries with, a flexible material for the purpose of conforming to the shape of the molded blocks. Between the gang-saws are pressure bars 84, secured together by the cross-bars 85 and 86. The pressure-bars 84 are movably secured to the rod 87, which is fastened by eye-bolts or similar mechanism to the table. The outside pressure-bars are provided with the movable weights 88, for the purpose of regulating the pressure of said bars and with the set-screw 89, which regulates their distance from the table. The object of the pressure-bars 84, is to prevent the saws from throwing the pins after they are cut off, and also to guide the pins into a receptacle at the end of the machine. (Not shown.)

In Figs. 1 and 2, I have shown the two sets of perpendicular saw-arbors fixedly secured to the frame, but I prefer to have them adjustable as a set of saws on stationary shafts as shown in said figures will be changed in the distance between their peripheries every time they are filed, which reduces them in diameter until they become too small for use. This would cause the slots in the pins to vary in length which is very objectionable. I therefore construct the machine with the saw-arbors of each set of horizontal saws made adjustable as shown in Figs. 8, 9, and 10, in which the frame of the machine, is provided with the top cross-tie 90 and the bottom cross-tie 91. These cross-ties are provided with the elongated mortises 92, in which the tenons 93, of the movable upright posts 94, and 95, are inserted. The saw-arbors are attached to the posts 94 and 95, by the ordinary journal-boxes 96, and the foot-boxes 97. Attached to the permanently fixed posts 98, are the ordinary journal boxes 101 provided with the annular recess 102. (See Fig. 12.) The object of this recess is to receive a collar which is fixedly secured to the one end of each shaft 103, thereby preventing any lateral movement of the same. On the other end of each shaft 103, are the miter-wheels 104. These gear with the miter-wheels 105, that are secured on the upright shaft 106, which is secured to the side of the frame of the machine by the journal box 107, and the foot-box 108. At the upper end of the shaft 106, is the hand-wheel 109. The shafts 103, are further provided with the right and left-hand screw-threads 110. They are movably secured to the upright posts 94 and 95, by the screw-threaded boxes 111. (See Figs. 13 and 14.) It will be seen that by turning the hand-wheel 109, in one direction the movable upright posts 94 and 95 to which the saw-arbors are attached, move toward each other, thus making a set of saw-arbors perfectly adjustable in a horizontal direction.

Having thus described my invention, what I claim as new therein, and desire to secure by Letters Patent, is—

1. In a machine for making clothes pins, the combination of the rollers 62, 65 for feeding the blocks, the horizontal saws 49, 56 for forming slits or openings in the sides of the blocks, the upper and lower cutter-heads for molding the upper and lower faces of the block, the coping saws 45, 52 for forming the spring prongs 79, 80, and tapering openings, the saws for cutting the blocks into pins, and the pressure bars provided with the weights and adjusting screws for guiding the blocks after they are cut, substantially as shown and described.

2. In a machine for making clothes pins, the combination of the rolls for feeding the blocks to the cutters, a pair of primary grooving saws for forming slits or openings in the sides of the blocks, a pair of guides 69 and 70 fitting into said slits or openings, a pair of cutter-heads, a pair of cutters for finishing the grooves formed by the primary saws, the guides 73 and 74, extending above the finishing cutters, the central guide 82 for preventing lateral displacement of the block while being fed to the vertical saw, and the saws for cutting the blocks into pins, substantially as shown and described.

3. The combination of a suitable feed, an initial grooving saw 49, a combined coping saw and cutter in line with the initial saw for finishing the groove, a guide 70 extending from one saw to the other, and in position to enter the kerf of the first saw, and suitable molding cutters for finishing the faces of the blocks, as explained.

4. The combination of a suitable feed, an initial grooving saw 49, a combined coping saw and cutter in line with the initial saw, for finishing the groove, a guide 70 extending from one saw to the other, and a guide 73 extending above the coping saw, for preventing the block from splitting while being cut by the coping saw, and suitable molding cutters for finishing the faces of the blocks, as explained.

5. In a machine for making clothes pins, the combination with the feeding rolls, the cutters for molding the faces of the blocks to the desired form, the guides, the severing saws, 17, the rolls for feeding the blocks to the severing saws the pressure-bars 84 pivoted to the machine table, for guiding the pins after they are cut, the adjustable weights 88 on said pressure-bars and the adjusting screws 89 for regulating the distance of the pressure bars from the table, substantially as described.

CHARLES W. HALL.

Witnesses:
BEN R. HAGAR,
AUSTIN T. HERRICK.